United States Patent [19]

Bowes

[11] Patent Number: 4,582,815
[45] Date of Patent: Apr. 15, 1986

[54] EXTRUSION OF SILICA-RICH SOLIDS

[75] Inventor: Emmerson Bowes, East Amwell, N.J.

[73] Assignee: Mobil Oil Corporation, New York, N.Y.

[21] Appl. No.: 628,680

[22] Filed: Jul. 6, 1984

[51] Int. Cl.[4] .......................... B01J 21/12; B01J 29/06
[52] U.S. Cl. ...................................... 502/64; 502/232; 502/243; 423/332
[58] Field of Search ...................... 502/9, 64, 232, 243, 502/68; 423/332

[56] References Cited

U.S. PATENT DOCUMENTS

| | | | |
|---|---|---|---|
| 1,493,708 | 5/1924 | Schneider | 423/332 |
| 3,030,314 | 4/1962 | Knowlton et al. | 502/243 X |
| 3,234,147 | 2/1966 | Drost et al. | 502/68 |
| 3,287,281 | 11/1966 | Haden, Jr. et al. | 502/64 |
| 3,534,110 | 10/1970 | Juguin et al. | 502/243 X |
| 3,840,587 | 10/1974 | Pearson | 502/243 X |
| 4,256,682 | 3/1981 | Denton | 502/232 |

FOREIGN PATENT DOCUMENTS

| | | | |
|---|---|---|---|
| 2625705 | 12/1976 | Fed. Rep. of Germany | 502/232 |
| 2907942 | 9/1980 | Fed. Rep. of Germany | 502/232 |

Primary Examiner—Carl F. Dees
Attorney, Agent, or Firm—Alexander J. McKillop; Michael G. Gilman; Dennis P. Santini

[57] ABSTRACT

The present invention is directed to a method for extruding silica-rich solids. The method comprises mixing silica-rich solids with water in an alkali metal base or basic salt followed by mulling and extruding and subsequently drying the extrudate whereby the dried extrudate has a crush strength superior to that of the prior art. The silica-rich solids can be silica alone, zeolite alone or a mixture thereof. The alkali metal can be sodium hydroxide. The invention is also directed to a product which has a special attribute in that they have sufficient integrity to withstand treatments with acids so that it is now possible to steam, acid extract, or calcine such extrudates. The catalyst can be used in hydrocarbon conversions such as hydrocracking, isomerization, hydrogenation, dehydrogenation, polymerization, reforming, catalytic cracking, or catalytic hydrocracking.

The invention also relates to a method for extruding silica-rich solids which comprises substituting an alkali metal for hydrogen in silanol groups on outside surfaces of the silica-rich solids, mulling and extruding the substituted silica-rich solids and drying the extrudate whereby the dried extrudate has a crush strength superior to that of the prior art.

The invention is also directed to a method for increasing the silica to metal ratio of a zeolite. The method comprises mixing silica-rich solids with water and an alkali metal base or basic salt, mulling and extruding the silica-rich mixture, drying the extrudate, ion exchanging the extrudate and recovering the catalyst which can be substantially metal free.

61 Claims, No Drawings

EXTRUSION OF SILICA-RICH SOLIDS

BACKGROUND OF THE INVENTION

1. Field of the Invention

This invention relates to a novel extrusion process for preparing silica rich extrudates having a high crush strength. In particular, this invention is concerned with an extrusion process for extruding either silica by itself, a zeolite by itself, or more preferably silica and a crystalline aluminosilicate zeolite such as ZSM-5 in order to produce a material which has substantially the same strength as or greater strength than a corresponding extrudate made from alumina. This invention also relates to the novel extrudates produced by the novel process.

2. Description of the Prior Art

It has long been known in the art that extrusion is one way of obtaining a material which has a high degree of strength for various applications, both catalytic and noncatalytic. Some aluminosilicate zeolites have long been used as catalysts for a wide variety of organic conversion processes and, in general, crystalline aluminosilicate zeolites are incorporated with a matrix or binder material in order to impart strength thereto. The most commonly used matrix materials have included alumina and mixtures of the same with clays for the reason that these materials were very easy to extrude and resulted in the production of an extrudate which had desirable physical strength.

It had long been recognized in the art that silica is a desirable matrix and that it possessed advantages over alumina with regard to certain catalytic reactions. In this connection, U.S. Pat. No. 4,013,732 specifically discloses ZSM-5 with a silica matrix, i.e., see Column 7. U.S. Pat. No. 3,843,741 and U.S. Pat. No. 3,702,886 would broadly teach the use of ZSM-5 with a silica matrix. Thus, although the concept of having a material such as ZSM-5 with a silica matrix is not novel, the fact remains that it was not possible to prepare said composition via an extrusion technique because silica and zeolites will not extrude in conventional extruding equipment to give reasonably strong products and the only way that the prior art was able to obtain mixtures of ZSM-5 and silica was by a filling or pelleting which involved mixing silica and the appropriate zeolite and squeezing it together to form a shaped structure having minimum physical strength.

There also exists a wide body of art for producing catalysts from silica gels, such as U.S. Pat. No. 3,969,274, the entire disclosure of which is herein incorporated by reference. The said patent teaches the advantages of having silica as a support for catalysts but utilizes a silica gel which has been subjected to steam treating in order to enhance its crush strength. It is obvious that the said patent requires a steaming step in order to make its process operable (i.e., see Example 4) whereas steaming per se is not an essential step to produce the novel extrudate of this invention.

There also exists a body of art involving post treatment of a silica-zeolite pellet or extrudate with various materials in order to increase the strength thereof. Thus, for example, U.S. Pat. No. 3,846,337 discloses silica-bound silicate particles of improved crush strength and can be prepared by admixing reactive silica sols with siliceous particles thereafter contacting the resulting combination with ammonium phosphate and/or acid phosphate.

U.S. Pat. No. 4,111,843 teaches the preparation of porous silica particles by adding excess alkali to a body of water glass and then precipitating a hydrogel with acid. The excess alkali is stated to be responsible for increasing pore diameter. The patent specifically teaches at Column 2, line 15 and following, that the extrudability of microporous silica-alumina catalyst carriers of exceptional strength can be achieved by following the process of the patent. However, the patent does not teach anything with regard to extrudates of silica particles, i.e., see Column 6, line 66 and following.

DESCRIPTION OF THE PREFERRED EMBODIMENTS

It has now been discovered that it is possible to make extrudates of exceptional strength, e.g., extruding silica rich solids simply by mulling either pure silica, or a crystalline aluminosilicate zeolite, or more preferably, a mixture of silica with a crystalline aluminosilicate zeolite with water to a solids level of 25 to 75 percent in the presence of 0.25 to 10 weight percent of a basic material such as sodium hydroxide (calculated as solid sodium hydroxide and based on the total solids present).

While not wishing to be bound by any theory of operation, it appears that the successful extrusion or formation of shaped bodies by wetting and compressing powders requires that the particles be capable of being brought into close proximity with each other so that the van der Waals forces become operative in subsequently holding the particle together. Chemical binding by crosslinking may also occur for some binders but the initial requirement is still for close packing. Highly siliceous materials like silica and zeolites of high silica-to-alumina ratios are hydrophobic. It has been discovered that by substituting an alkali metal for hydrogen in the silanol groups on the outside surfaces of siliceous materials they can generally thereby be made more easily extrudable with crush strengths far exceeding those heretofore described for silica-bound materials.

Suitable agents for carrying out the novel extrusion process of this invention are hydroxides of Group I metals of the Periodic Table as well as basic salts such as alkali metal carbonates, borates, phosphates, silicates, etc. Ammonium hydroxide is not effective but more basic quaternary ammonium hydroxides can be used although they are not preferred because of a tendency to produce thixotropic masses which are difficult to extrude as well as the fact that they are relatively expensive. In general, suitable agents are those materials which have a pH greater than 11 at 0.1 normal concentration. The most preferred material is sodium hydroxide. The novel process of this invention and the products produced therefrom have significant advantages over heretofore practiced technology. At the outset, the process is applicable to all zeolites and all crystal sizes. Secondly, the zeolite content can be varied from 0 to 100 percent and the materials have low dust-forming tendencies and are hydrophobic, particularly when highly siliceous zeolites are used.

The novel process of this invention is carried out by adding water to highly siliceous solid whether it be silica by itself, a zeolite by itself, or a mixture of silica and a zeolite. As has previously been stated, the amount of water added is such to have a total solids content based on the total solids of from 25 to 75 percent when using a mixture of a zeolite such as ZSM-5 and silica. A more preferred range of total solids content is from 35 to 60 percent.

The alkali metal compound is added with the water in an amount of from 0.25 to 10 weight percent and more preferably 2 to 6% (calculated as sodium hydroxide equivalent on a dry basis based on total solids) and the mixture is then mulled. The period of time in which the mulling is carried out is not narrowly critical and satisfactory results have been obtained in as little as 5 minutes, but the preferred mulling time is from 5 minutes to one hour with 15 to 30 minutes being particularly preferred. Any suitable commercially available muller can be employed such as a 12 inch S. S. Lancaster Muller mixer manufactured by Posey Iron Works Inc. After the mulling has been carried out the silica material is extruded in any conventional extruder such as a 1 inch Killion extruder with a cobalt alloy barrel and multi-holed (1/16th inch) die. This extruder is manufactured by Killion Extruders, Inc. Following the extrusion, the silica composite is dried, preferably overnight, usually at about 100° to 200° C. At this stage the extrudates are uniquely strong and may be subject to any handling and processing including processing with liquids normally reserved for calcined catalysts. It is desirable to neutralize the base used as an extrusion aid before calcining because it has been found that calcining can cause the alkali metal to be trapped, perhaps by encapsulation, and it can then be removed by ion exchange with great difficulty and usually incompletely. The base is neutralized by an equivalent or preferably a slight excess of dilute nitric acid in 1 M ammonium nitrate solution, or by circulating the ammonium salt and adding acid at some point in the circulating stream to maintain a constant pH. It is also possible at this stage to remove aluminum from the outside of the zeolite while the interior is protected by an organic substance too big to leave the zeolite without prior decomposition. If the zeolite contains no trapped organic material within it, further ion exchange with ammonium or rare earth or other metals may be carried out immediately.

As is well known in the art, base exchang e of a zeolite is carried out by contacting the same with a suitable solution of the desired cation. Techniques of this type are well known in the art and are specifically taught in U.S. Pat. Nos. 3,140,249; 3,140,252; and 3,140,253; the disclosures of which are herein incorporated by reference.

Following the ion exchange the material is then calcined by heating the same in air or other inert gas at temperatures of from 500° F. to 1500° F. for 1 to 48 hours or more.

If organics are present, the catalyst may be treated as is with reagents to remove alumina from the outside surface if so desired or calcined in air or inert atmosphere to remove the organics and then ion exchanged to the ammonium form or other desired metal exchanged form. It is a special attribute of the subject extrudates that they have sufficient integrity to withstand treatment with acids so that it is now possible to extrude a zeolite such as Y zeolite and steam, acid extract, calcine or effect combinations thereof to produce a stable high silica-to-alumina Y in an easily handled form and such processes for dealuminizing Y are well known in the art, i.e., see *Zeolite Chemistry and Catalysis,* Jule A. Rabo ACS Monograph 171(1976) Chapter 4—the entire disclosure being herein incorporated by reference.

Hitherto, it was not possible to acid treat, for example, an alumina-bound zeolite because the binder was not acid resistant and to treat the zeolite powder before extruding was difficult and expensive. This processing is not limited to any particular zeolite and may be used to increase the silica-to-alumina ratio of the more acid resistant zeolites having a silica-to-alumina ratio of at least 3 and higher, such as ZSM-5 and related zeolites. It is particularly useful, however, for making hydrocracking catalysts containing dealuminized Y or other large pore zeolites.

It is to be understood that dealuminizing of a zeolite is but one embodiment of this invention and it also includes compositing silica with zeolites wherein no dealuminizing is carried out. Typical zeolites include ZSM-4 (Omega); ZSM-5; ZSM-11; ZSM-12; ZSM-23; ZSM-35; ZSM-38; ZSM-48, Beta; X; Y; L; as well as ferrierite, mordenite, dachiardite, clinoptolite, offretite, erionite, gmelinite, chabazite, etc.

It is to be understood that the identification of the crystalline zeolites be resolved on the basis of their respective X-ray diffraction patterns. As is obvious, the present invention contemplates utilization of such zeolites wherein the mole ratio of silica-to-alumina is essentially unbounded as well as where other metals are in the lattice. The crystalline zeolites are not limited to specific alumina mole ratios, it now being known that such zeolites may be substantially aluminum-free and, yet, having the same crystal structure as the disclosed materials, may be useful or even preferred in some applications. It is the crystal structure, as identified by the X-ray diffraction "fingerprint", which establishes the identity of the specific crystalline zeolite material.

The novel extrudates of this invention have a crush strength of from 5 to 24 pounds for a ⅛ inch length having a 1/16th inch diameter. It is believed that the silica extrudates of this invention having such a high crush strength are novel materials, especially when the porosity and large pore size are considered. In addition, the silica and silica-bound extrudates of this invention (not 100% zeolite) are also characterized by a high porosity, i.e., between 0.43 to about 1 cc/gram (measured by mercury porosimeter) and large pore size greater than 70% of the pores between 200 and 600 Angstroms.

The silica extrudates of this invention can find utility in a wide variety of processes which are both catalytic and noncatalytic. Quite obviously, the materials can be used as sorbents. Additionally, the materials can be used as catalysts for a wide variety of organic conversions. As is known in the art, silica does not possess any catalytic activity such that incorporation of a zeolite in the silica leads to some unusual effects. The silica can be used as a support for a catalytic material such as a hydrogenation component such as platinum, palladium, cobalt, molybdenum, iron or mixtures of the same. The catalytic metals in the form of their oxides or salts can also be added to the silica during the mulling step. In addition, the zeolite silica extrudates find utility in hydrocracking, isomerization, hydrogenation, dehydrogenation, polymerization, reforming, catalytic cracking, catalytic hydrocracking, and the like. Thus, the extrudates of these inventions can be used with or without added active metal components for catalytic cracking, isomerization, alkalation, reforming, and hydrogenative conversions such as hydrocracking, hydrogenation and hydrofining, e.g., desulfurization and denitration. Catalytic cracking conditions usually include temperatures of at least 600° F. generally 750°-1000° F. and pressures between atmospheric and 200 psig. Hydrogenative conversions can be accomplished at various conditions depending on the feedstock characteristics and the desired degree of conversion. Hydrogenation can be effected at pressures of about 500 psig and above and temperatures of 500° to 1000° F. usually 600° to 900° F. Hydrogen is added at rates of at least about 500 standard cubic feet per barrel, usually 1000 to 20,000 SCF/BBL, hydrofining and hydrogenation feeds boil above 400° F. usually between about 500° and 1200° F.

Although the method herein described is particularly attractive for the production of silica bound aggregates, it can also be employed with advantage with silica containing a substantial proportion of other refractory oxides, such as alumina, zirconia, magnesia, titania, and the like. The problems involved in obtaining a strong composite are not as acute when the binder contains refractory oxides other than silica. Nevertheless, the problems associated with silica bonding still exist. Thus, the properties of such combinations can be improved by the method of this invention. However, it is preferable to retain the chemical characteristics of silica and therefore the expression silica-rich solids refers to materials which are zeolitic or non-zeolitic wherein the silica concentration should be at least 50 weight percent, preferably about 75-100 percent.

The silica employed in the novel process and compositions of this invention is not narrowly critical and the suitable source of hydrated silica can be employed. A particularly suitable silica is Hi-Sil 233 which is a hydrated silica available from PPG Industries, Inc. The following Examples will now illustrate the best role contemplated for carrying out this invention.

EXAMPLE 1

Extrusion of ZSM-5/Silica (65/35 weight percent)

A quantity (296 g.) of zeolite ZSM-5 (as synthesized) (equivalent of 260 g of calcined zeolite) and 152 g of amorphous silica, Hi-Sil 233 (a hydrated silica manufactured by PPG) (equivalent of 140 g of calcined silica) were blended together in a 12 inch die Lancaster mixer-muller (manufactured by Posey Iron Works Inc.) for 15 minutes. At the end of this time water containing 12 g of sodium hydroxide was added over the course of 12.5 minutes with continuous mulling. The mix contained 49.4% solids on a dry calcined basis, and the sodium hydroxide was 3 percent by weight of the solids. Mulling was continued for a further 15 minutes. At the end of this time, the muller contents were transferred to the feed inlet of a 1 inch Killion extruder (manufactured by Killion Extruders Inc.) and extruded through a die plate containing 1/16th inch diameter holes. The extruded material was dried overnight then soaked in a solution of 1 N ammonium nitrate/0.15 N nitric acid for one hour. The volume of solution to weight of extrudate was 5 ml/g. The extrudate was washed and redried at 105° C. and heated up to 538° C. in nitrogen to remove organic matter from the zeolite. The nitrogen calcined extrudate was then ammonium ion exchanged to remove sodium by contacting it with 1 N aqueous ammonium nitrate solution three times at room temperature using five volumes of solution/g of extrudate. The extrudate was finally calcined in air at 538° C. to remove the ammonium ion and form the finished acid catalyst.

The finished catalyst had an average crush strength of 71#per inch (average for 20 pieces) as measured by the force recorded on a force gauge when a ⅛ inch length of the extrudate was crushed between a flat metal plate and a ⅛ inch flat bar attached to the force gauge. Porosity measured by mercury porosimeter to 35 Angstrom was 0.615 cc/g with pore diameters concentrated between 200 and 600 Angstroms.

EXAMPLE 2

Extrusion of ZSM-5/Silica (65/35 weight percent)

A similar mixture of ZSM-5 and silica (Hi-Sil 233) was treated as in Example 1 except that no sodium hydroxide was used. It was necessary to add water to give 44% solids before the mix would extrude through a die, and then initially a ⅛ inch die plate had to be used followed by extrusion through a 1/16th inch die plate. The extrudate was dried, nitrogen calcined, ammonium ion exchanged and air calcined as in Example 1. An ⅛ inch length of the extrudate would not support 1#, the crush strength was, therefore, less than 8#/inch. When adapting methods developed on one extruder to another, particularly of different sizes, changes may have to be made in the moisture content of the extrudable mass. In the process described herein it is also possible to vary the amount of sodium hydroxide. Thus, for a larger extruder fitted with pins in the barrel, work is done on the mixture as it is extruded which supplements the work done in the muller. Usually less water is required to produce a strong extrudate, and it has been found that a smaller amount of sodium hydroxide may be used. The adjustment of water and sodium hydroxide used need only be done when first setting up the conditions for a given product and is well within the skills of one versed in the art of extruding. In fact, the flexibility allows choices to be made in product porosity not usually available when extruding many catalysts with alumina binders. The following two examples show the effect of the larger extruder wherein Example 3 solids were raised to 54% compared to 49.4% in Example 1 giving a very strong product and in Example 4, the sodium hydroxide was reduced to 1% on solids to give a weaker but still more than acceptable strength.

EXAMPLE 3

Extrusion of ZSM-5/Silica (65/35 weight percent)

In this example, a 2000 g Dried Calcined Basis (DCB) batch was processed using the same procedure as in Example 1, except that a 2 inch diameter auger extruder was used that was manufactured by the Bonnot Company and the solids content of the extruded mass was 54 weight percent. The crush strength of the dried extrudate was 168#/inch and that of the finished extrudate was 120#/inch. The great strength of the dried extrudate shows the superiority of silica extrudates of the present process over conventional extrusion with alumina. The strength of the freshly dried silica extrudate allows any sort of handling and processing before calcining that would normally have to be reserved for after calcining as, for example, when processing alumina bound extrudates which are too fragile when first dried. Although the final strength is less than the as dried strength, it is more than satisfactory for commercial applications. Porosity measured by the mercury porosimeter was 0.466 cc/g with pores essentially between 200 and 400 Angstrom with an average of 300 Angstrom. Sodium content was less than 100 ppm.

EXAMPLE 4

Extrusion with Reduced Concentration of Sodium Hydroxide

A 2000 g Dried Calcined Basis (DCB) batch was processed as in Example 3 except that the sodium hydroxide was reduced to 1% on solids and the solids content was 54.3%. The crush strength of the final product in its acid form was 86#/inch. Porosity measured as above was 0.517 cc/g with pores between 120 and 400 Angstrom diameter with an average of 260 Angstrom. The next example illustrates how an extrudate can be made of pure zeolite without binder which provides a catalyst of the highest possible concentration of active materials and devoid of the deleterious effects of binders in terms of catalytic selectivity. When the zeolite is substantially aluminum free, the extrudate is especially useful for effecting in a practicable way the removal of trace organics from water. Much has been made hitherto of the value of highly siliceous materials for this purpose because of their hydrophobic nature but their use as powder is costly because of the need to filter off the powder after use. Now extrudates and other shapes of superior strength can be made easily and packed in towers through which liquids can be pumped and automatically separated from the solid.

EXAMPLE 5

Extrusion of Binder Free ZSM-5

Eight hundred (800) grams of ZSM-5 dried calcined basis (DCB) was mulled for 1 hour in the mixer-muller described in Example 1 at which time 48 g of 50% weight sodium hydroxide solution in 431 g of water were added over 12.5 minutes and the mulling continued for 15 minutes. The mix was then extruded through a 1/25th inch die plate and the extrudate dried at 105° C. overnight. The dried extrudate received the same treatment as in Example 1. The finished catalyst had a crush strength of 59#/inch.

EXAMPLE 6

The following table indicates the wide range of applicability of the process for different zeolites.

| Zeolite | % (DCB) | Binder | wt % (DCB) | % Alkali* | % Solids | Crush #/in |
|---|---|---|---|---|---|---|
| ZSM-12 | 65 | Hi-Sil | 35 | 3 | 52 | 70 |
| Mordenite | 65 | Hi-Sil | 35 | 3 | 54 | 61 |
| Y | 50 | Hi-Sil | 50 | 3 | 54 | 95 |
| Y | 80 | Hi-Sil | 20 | 4.5 | 54 | 69 |
| Beta | 80 | Hi-Sil | 20 | 4 | 51 | 83 |

In the above examples X-ray diffraction data obtained on the finished extrudates showed that no damage had been done to the crystallinity of the zeolites such as mordenite, Y and beta or the highly siliceous zeolites.

The ability to extrude highly siliceous materials opens up the possibility of producing cheaply strong silica extrudates for catalyst supports. The production of a silica extrudate is illustrated in the following example. A great variety of silica supports may be made from different silica sources to produce various pore sizes and by drying or calcining at various temperatures to control surface area and surface activity. By preserving silanol groups by low temperature drying unexpectedly strong extrudates are formed which are suitable for mounting enzymes for use as catalysts, for mounting organo-metallic catalytic substances, or for use as selective adsorbents for effecting separation techniques or concentrating substances from solvents, especially aqueous phases.

EXAMPLE 7

Extrusion of 100% Silica

Four hundred and thirty-four (434 g) grams of Hi-Sil 233 were mulled for 21 minutes in the Lancaster muller and water containing 12 g of sodium hydroxide added over 11.5 minutes to give a solids content of 39% weight. The mix was extruded through a 1/16th inch die plate on the Killion extruder heretofore described, dried and then soaked in a solution of 1 N ammonium nitrate and 0.15N nitric acid. After calcining at 1000° F., the extrudate had a crush strength of 62#/inch, a porosity as measured by a mercury porosimeter to 35 Angstrom of 1.02 cc/g, a substantially uniform pore size of 300 Angstrom units and a sodium content of less than 100 ppm. Spheres were made by rolling the freshly extruded material before drying. These and other shapes are particularly useful as catalyst supports for phosphoric acid, metal oxides and metals.

EXAMPLE 8

A silica extrudate was produced by mulling 217 g of Hi-Sil 233 with a solution of 8 g anhydrous sodium carbonate in 308 g of water for 25.5 minutes (including solution addition time of 10.5 minutes) then extruding through a 1/16th inch die on the Killion 1 inch extruder. After drying at 105° C. overnight, the extrudate was treated with 1N ammonium nitrate/0.13N nitric acid, washed, dried and then calcined at 538° C. Crush strength was 44 lbs. per inch.

What is claimed is:

1. A method for extruding silica-rich solids which comprises mixing the silica-rich solids with water and an alkali metal base or basic salt followed by mulling and extruding wherein the amount of water added being sufficient to have a total solids content of from 25 to 75 weight percent, the alkali metal compound being added in an amount of from 0.25 to 10 weight percent on a dry basis based on the total solids calculated as sodium hydroxide equivalent, and drying and calcining the extrudate, whereby the dried and calcined extrudate has a crush strength superior to that of the prior art.

2. The method according to claim 1 wherein the silica-rich solid is silica.

3. The method according to claim 1 wherein the silica-rich solid is a zeolite material.

4. The method according to claim 1 wherein the silica-rich solid is ZSM-5.

5. The method according to claim 1 wherein the silica-rich solid is a mixture of silica and a crystalline aluminosilicate.

6. The method according to claim 5 wherein the crystalline aluminosilicate has a silica-to-alumina ratio greater than 100.

7. The method according to claim 1 wherein the silica-rich solid is a mixture of ZSM-5 and silica.

8. The method according to claim 1 wherein the alkali metal base is sodium hydroxide.

9. The method according to claim 4 wherein the alkali metal base is sodium hydroxide.

10. The method according to claim 6 wherein the alkali metal base is sodium hydroxide.

11. The product produced by the method according to claim 1 having a crush strength of at least 4 pounds for a ⅜ inch length having a diameter of 1/16th inch.

12. The product produced by the method according to claim 2 having a crush strength of at least 4 pounds for a ⅜ inch length having a diameter of 1/16th inch.

13. The product produced by the method according to claim 3 having a crush strength of at least 4 pounds for a ⅜ inch length having a diameter of 1/16th inch.

14. The product produced by the method according to claim 4 having a crush strength of at least 4 pounds for a ⅜ inch length having a diameter of 1/16th inch.

15. The product produced by the method according to claim 8 having a crush strength of at least 4 pounds for a ⅜ inch length having a diameter of 1/16th inch.

16. The product produced by the method according to claim 5 having a crush strength of at least 4 pounds for a ⅜ inch length having a diameter of 1/16th inch.

17. The product produced by the method according to claim 6 having a crush strength of at least 4 pounds for ⅜ inch length having a diameter of 1/16th inch.

18. The product produced by the method according to claim 7 having a crush strength of at least 4 pounds for ⅜ inch length having a diameter of 1/16th inch.

19. A method for increasing the silica-to-alumina ratio of a zeolite having an initial silica-to-alumina ratio of at least 3 which comprises the product of claim 5 treated so as to remove at least a portion of the aluminum from said zeolite.

20. The method according to claim 19 wherein said zeolite is zeolite Y.

21. The method according to claim 19 wherein said zeolite is ZSM-5.

22. The method according to claim 19 wherein said zeolite is Beta.

23. The method according to claim 1, wherein the alkali metal base is a hydroxide of Group I metals of the Periodic Table of Elements.

24. The method according to claim 1, wherein the alkali metal base is a carbonate, borate, phosphate or silicate.

25. The method according to claim 1, wherein the base is a quaternary ammonium hydroxide.

26. The method according to claim 1, wherein the base has a pH greater than 11 at 0.1 normal concentration.

27. The method according to claim 1, wherein the total solids content is from 35 to about 60 weight percent.

28. The method according to claim 1, wherein the alkali metal compound being added in an amount from 2 to 6 weight percent on a dry basis based on the total solids calculated as sodium hydroxide equivalent.

29. The method according to claim 1, wherein the duration for mulling is from 5 minutes to 60 minutes.

30. The method according to claim 1, wherein the duration for mulling is from 15 minutes to 30 minutes.

31. The method according to claim 1, wherein the extrudate is dried at a temperature from 100° to 200° C.

32. The method according to claim 1, further comprising neutralizing the base used as an extrusion aid after drying and after calcining the extrudate.

33. The method according to claim 32, further comprising neutralizing using at least an equivalent of dilute nitric acid in ammonium nitrate solution.

34. The method according to claim 33, wherein an excess of dilute nitric acid in ammonium nitrate solution is used to neutralize the base used as an extrusion aid.

35. The method according to claim 1, further comprising neutralizing the base used as an extrusion aid after drying by circulating ammonium salt and adding acid during circulation.

36. The method according to claim 3, further comprising ion-exchanging the extruded dried zeolite.

37. The method according to claim 5, further comprising ion-exchanging the extruded dried and calcined silica-rich solid.

38. The method according to claim 36, further comprising calcining the ion-exchanged zeolite in inert gas at a temperature from 500° to 1000° F. for at least 1 hour.

39. The method according to claim 3, wherein the zeolite is ZSM-4, ZSM-11, ZSM-12, ZSM-23, ZSM-35, ZSM-38, ZSM-48, Zeolite Beta, zeolite X, zeolite Y, zeolite L, ferrierite, mordenite, dachiardite, clinoptolite, offretite, erionite, gmelinite, or chabazite.

40. The method according to claim 3, wherein the zeolite contains another metal.

41. The method of claim 1, further comprising treating the extrudate by steaming, acid extracting, calcining or a combination of those treatments to produce a stable extrudate.

42. A method of extruding a mixture of silica and crystalline aluminosilicate solids which comprises mixing silica and ZSM-5 zeolite with water and sodium hydroxide followed by mulling and extruding, wherein the amount of water added being sufficient to have a total solids content of from 25 to 75 weight percent, the sodium hydroxide being added in an amount from 0.25 to 10 weight percent on a dried basis based on the total solids calculated as sodium hydroxide equivalent, and drying and calcining the extrudate whereby the extrudate has a crush strength of at least 4 pounds for a ⅜ inch length having a diameter of 1/16 inch.

43. A method for extruding a mixture of silica and a crystalline aluminosilicate which comprises mixing silica and zeolite Y with water and sodium hydroxide followed by mulling and extruding, wherein the amount of water added being sufficient to have a total solids content of from 25 to 75 weight percent, the sodium hydroxide being added in an amount from 0.25 to 10 weight percent on a dried basis based on the total solids calculated as sodium hydroxide equivalent, and drying and calcining the extrudate whereby the extrudate has a crush strength of at least 4 pounds for a ⅜ inch length having a diameter of 1/16 inch.

44. A method for increasing the silica-to-alumina ratio of a zeolite, comprising:

mixing silica-rich solids containing zeolite with water and an alkali metal base or basic salt, the amount of water added being sufficient to have a total solids content of from 25 to 75 weight percent, the alkali metal compound being added in an amount from 0.25 to 10 weight percent on a dry basis based on the total solids calculated as sodium hydroxide equivalent;

mulling and extruding the silica-rich mixture containing zeolite;

drying the extrudate;

ion-exchanging the extrudate with an ammonium salt to remove alkali metal;

drying and calcining ammonium exchanged extrudate;

dealuminizing the extrudate; and recovering a catalyst which can be substantially aluminum free.

45. The method according to claim 45, further comprising ion-exchanging the recovered catalyst.

46. The method according to claim 46, wherein ammonium, rare earth or other metals are used to ion-exchange the recovered catalyst.

47. A method for increasing the silica-to-alumina ratio of zeolite Y, comprising:

mixing a mixture of silica and zeolite Y with water and sodium hydroxide, the amount of water added being sufficient to have a total solids content of from 25 to 75 weight percent, the sodium hydroxide being added in an amount from 0.25 to 10 weight percent on a dry basis based on the total solids calculated as sodium hydroxide equivalent;

mulling and extruding the mixture of silica and zeolite Y;

drying the extrudate;

ion-exchanging the extrudate with an ammonium salt to remove sodium;

drying and calcining ammonium exchanged extrudate;

dealuminizing the extrudate; and recovering a zeolite Y catalyst which can be substantially aluminum free.

48. A sorbent produced according to the method of claim 2.

49. A support produced according to the method of claim 2.

50. The support according to claim 50, containing a hydrogenation component.

51. The support according to claim 51, wherein the hydrogenation component being platinum, palladium, cobalt, molybdenum, iron or mixtures thereof.

52. The support according to claim 52, wherein the hydrogenation component being an oxide or salt.

53. The method according to claim 1, further comprising adding a catalytic material during mulling the mixture of silica-rich solids with water and alkali metal compound.

54. The method according to claim 54, wherein the catalytic material being platinum, palladium, cobalt, molybdenum, iron or mixtures thereof.

55. The method according to claim 1, wherein the dried and calcined extrudate has a crush strength from 5 to 24 pounds for a ⅛ inch length having a 1/16 inch diameter.

56. The method according to claim 1, wherein the silica-rich solids contain refractory oxides.

57. The method according to claim 57, wherein the refractory oxides being alumina, zirconia, magnesia or titania.

58. The method according to claim 1, wherein the extrudate has a porosity between 0.43 to about 1 cc/g and a pore size with greater than 70% of the pores being between 200 and 600 Angstroms.

59. A method for extruding silica-rich solids, which comprises substituting an alkali metal for hydrogen in silanol groups on outside surfaces of the silica-rich solids, mulling and extruding the substituted silica-rich solids and drying the extrudate, whereby the dried extrudate has a crush strength superior to that of the prior art.

60. A method for extruding silica-rich solids, which comprises mixing the silica-rich solids with water in an alkali metal base or basic salt followed by mulling and extruding wherein the amount of water added being sufficient to have a solids content of from 25 to 75 wt. %, the alkali metal compound being added in an amount from 0.25 to 10 wt. % on a dry basis based on the total solids calculated as sodium hydroxide equivalent, drying the extrudate, and neutralizing the base used as an extrusion aid after drying and prior to calcining the extrudate, whereby the calcined extrudate has a crush strength superior to that of the prior art.

61. The method according to claim 48, wherein the zeolite Y is dealuminized by alternately steaming and acid extracting a hydrogen form of the zeolite Y extrudate.

* * * * *